United States Patent
Sudhakar et al.

(10) Patent No.: US 8,458,236 B2
(45) Date of Patent: Jun. 4, 2013

(54) FILE SYSTEM INTERFACE FOR CIM

(75) Inventors: Gosukonda Naga Venkata Satya Sudhakar, Bangalore (IN); Ashwin Pankaj, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 523 days.

(21) Appl. No.: 12/173,971

(22) Filed: Jul. 16, 2008

(65) Prior Publication Data

US 2010/0017422 A1   Jan. 21, 2010

(51) Int. Cl.
*G06F 12/00* (2006.01)
*G06F 17/30* (2006.01)

(52) U.S. Cl.
USPC ........................................... 707/822

(58) Field of Classification Search
USPC ........................................... 707/822
See application file for complete search history.

(56) References Cited

U.S. PATENT DOCUMENTS

| | | | |
|---|---|---|---|
| 6,854,122 B1* | 2/2005 | Sheriff et al. | 719/316 |
| 7,043,732 B2 | 5/2006 | Mandal et al. | |
| 7,480,789 B1* | 1/2009 | Donlin et al. | 713/1 |
| 2002/0123966 A1 | 9/2002 | Chu et al. | |
| 2004/0025142 A1 | 2/2004 | Mandal et al. | |
| 2005/0138040 A1 | 6/2005 | Lamb et al. | |
| 2006/0036570 A1* | 2/2006 | Schaefer et al. | 707/1 |
| 2007/0240165 A1 | 10/2007 | Carey et al. | |
| 2007/0250363 A1 | 10/2007 | Boykin et al. | |
| 2008/0028058 A1* | 1/2008 | Shaw et al. | 709/223 |
| 2008/0066060 A1 | 3/2008 | Sonderegger | |
| 2008/0120327 A1 | 5/2008 | Bhat | |
| 2008/0126405 A1* | 5/2008 | Yin et al. | 707/103 R |
| 2008/0228770 A1* | 9/2008 | Halcrow et al. | 707/8 |
| 2010/0017410 A1 | 1/2010 | Pankaj et al. | |
| 2011/0191376 A2 | 8/2011 | Pankaj | |

OTHER PUBLICATIONS

"Novell Open Enterprise Server—Open WBEM Services Administration Guide for OES", (Oct. 25, 2006).
Davis, Darren R., "An Introduction to WBEM and OpenWBEM in SUSE Linux", http://www.novell.com/coolsolutions/feature/14625.html, (Posted Apr. 15, 2005), 5 pgs.
Kaur, Ramandeep, "AppNote: Modeling and Writing a Common Information Model (CIM) Provider", http://www.novell.com/coolsolutions/appnote/14816.html, (Posted May 10, 2005), 17 pgs.
Wessels, J. R., "Adding other File Systems or Network Resources to your NSS File System", (Posted Dec. 15, 2005), 2 pgs.

* cited by examiner

*Primary Examiner* — Fred I Ehichioya
*Assistant Examiner* — Kris Mackes
(74) *Attorney, Agent, or Firm* — Osha Liang LLP

(57) ABSTRACT

Systems and methods for managing systems using common information models (CIM) are presented. According to a method embodiment, CIM functions are provided, and a file system interface for the CIM functions is provided. An embodiment of a method receives file operation commands through a client interface and performs CIM functions corresponding to the received file operation commands based on a mapping of the file operation commands to the CIM functions.

14 Claims, 3 Drawing Sheets

- CIM_ManagedElement
  - CIM_ManagedSystemElement
    - CIM_LogicalElement
      - CIM_EnabledLogicalElement
      - CIM_RedundancyGroup
        - CIM_SoftwareIdentity
        - CIM_UnitOfWorkDefinition
        - CIM_AdministrativeDistance
        - CIM_BGPAttributes
        - CIM_BGPPathAttributes
        - CIM_BGPRouteMap
        - CIM_DynamicForwardingEntry
      - CIM_FilterEntryBase
        - CIM_FilterList
      - CIM_NextHopRouting
        - CIM_OSPFAreaConfiguration
        - CIM_RoutingPolicy
        - CIM_StaticForwardingEntry
      - CIM_LogicalFile
        - CIM_UnixFile
        - CIM_AccessControlInformation
        - CIM_Account
        - CIM_AuthenticationRequirement
      - CIM_SoftwareElement
      - CIM_SoftwareFeature
      - CIM_Job
      - CIM_StoragePool
        - OMC_StoragePool
    - CIM_PhysicalElement
    - CIM_MethodParameters
    - CIM_Product
    - CIM_ReplacementFRU
  - CIM_SettingData
    - CIM_StatisticalSetting
    - CIM_TimeZoneSettingData
    - CIM_CommonDatabaseSettingData
    - CIM_FCSwitchSettings
    - CIM_LogicalPortSettings
    - CIM_StorageSetting
    - CIM_ConnectivityMembershipSettingData
    - CIM_IPAssignmentSettingData
    - CIM_iSCSIConnectionSettings
    - CIM_iSCSISessionSettings
    - CIM_SAEndpointRefreshSettings
    - CIM_JobSettingData
    - CIM_StorageClientSettingData
    - CIM_ConfigurationData
    - CIM_RedundancySetSettingData
    - CIM_ScopedSettingData
      - CIM_ResourceAllocationSettingData
  - CIM_StatisticalData
  - CIM_StatisticalInformation
    - CIM_SupportAccess
    - CIM_SystemConfiguration
    - CIM_BlockStatisticsManifest
  - CIM_StorageError
    - CIM_IndicationFilter
  - CIM_ListenerDestination
    - CIM_Namespace
  - CIM_RegisteredProfile
    - CIM_SystemIdentification

FIG. 4

FILE SYSTEM INTERFACE FOR CIM

FIELD

This disclosure relates generally to network management, and more particularly to systems and methods for providing a file system interface to access common information models.

BACKGROUND

Common Information Model ("CIM") is a standard set forth by the Distributed Management Task Force ("DMTF"). CIM is an object oriented model to represent a wide variety of systems in a standard and neutral way, and is commonly referred to as the CIM schema. CIM is an open standard that defines how managed elements in an IT environment are represented as a common set of objects and relationships between them. CIM promotes consistent management of these managed elements, independent of their manufacturer or provider. That way a common component such as a server or a network router will be represented in a way that all management tools that use CIM will understand.

A related standard is Web-Based Enterprise Management (WBEM, also defined by DMTF) which defines a particular implementation of CIM, including protocols for discovering and accessing such CIM implementations. To create a standard way to access CIM, a working group of the DMTF developed a technique where CIM data can be accessed using the HTTP protocol used by the world wide web. Another standard used represents the CIM data in XML format. This gives us a common model for system management, a standard way to represent that model, and a standard way to access the model.

A CIM object manager ("CIMOM") is essentially a server for servicing CIM requests. A CIM provider provides data representing a single entity. In the case of hardware, there will theoretically be an instance of a CIM object representing each component, including, for example, each processor, video card, etc. Each of these sources has its own interface, some of which are very complex. There could be a representation of each component in only one, many, or all of the available data sources.

A primitive interface for using CIM is an SNIA (Storage Networking Industry Association) CIM browser. More powerful interfaces tend to be expensive and have a significant learning curve.

SUMMARY

According to a method embodiment, CIM functions are provided, and a file system interface for the CIM functions is provided. An embodiment of a method receives file operation commands through a client interface and performs CIM functions corresponding to the received file operation commands based on a mapping of the file operation commands to the CIM functions.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

BRIEF DESCRIPTION OF THE DRAWINGS

FIG. 4 illustrates an example of a directory listing, illustrating the file system used to manage CIM functions.

DETAILED DESCRIPTION

The present subject matter enables CIM capabilities through a file system interface. The file system interface enables extensive use of CIM capabilities, uses file utilities (copy, paste, save, etc.) to manage CIM functions which allows CIM instances to be saved as files and reused later, and which enables the automation of a large number of CIM tasks. Embodiments provide a CIM interface for four types of CIM providers, including an indication provider involving callbacks.

By providing CIM with a file system interface, an administrator is able to use an intuitive and powerful file system interface. Simple scripts can be written to perform routine yet time consuming CIMOM tasks. These tasks could include updates to a large number of CIMOM objects or to some which fit a given criteria (attribute value). Complex operations can be defined as simple scripts with the file system interface. Powerful operations involving multiple different operations that require a large number of steps can be actively shared with simple scripts.

Figure 1:
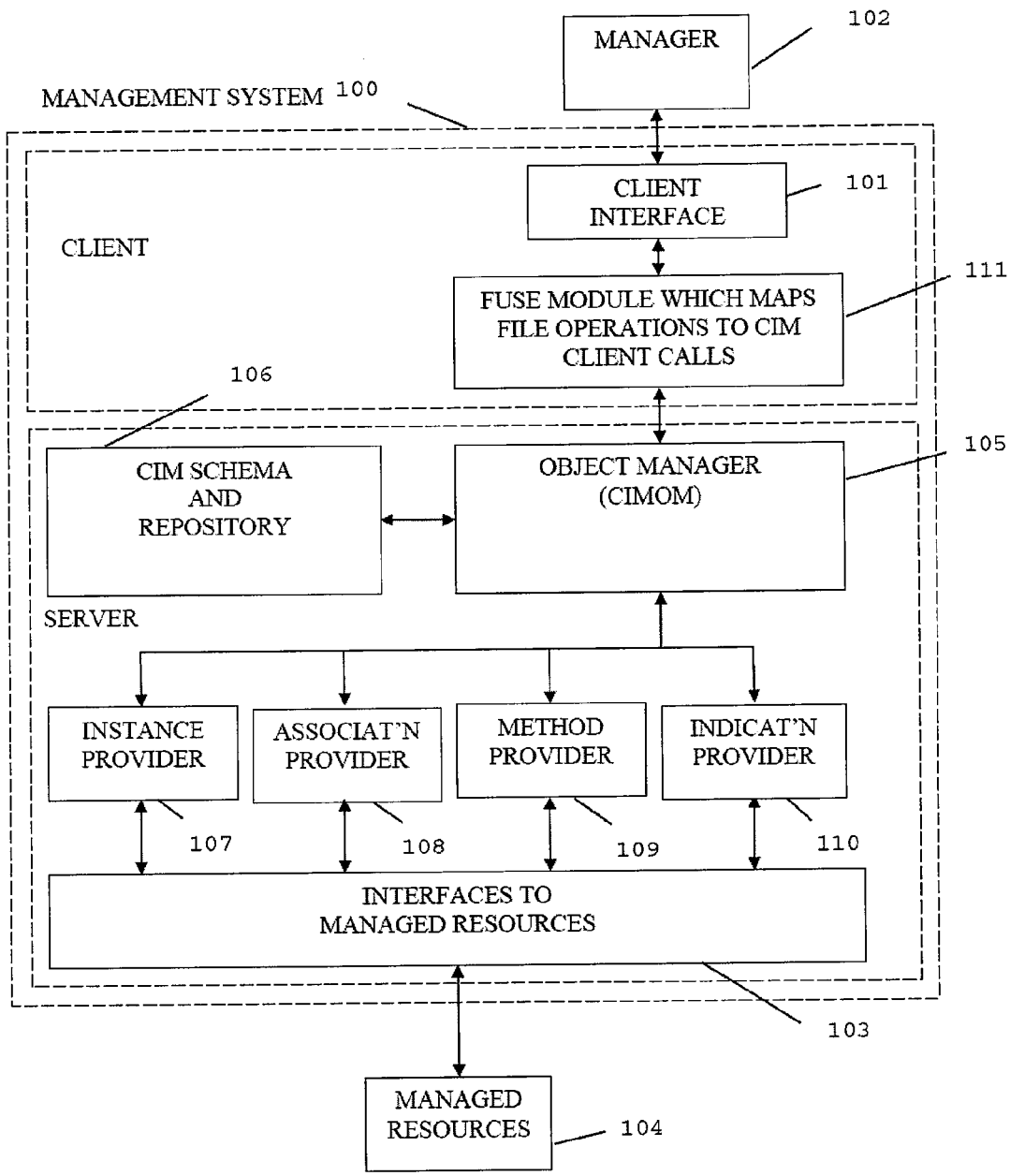
FIG. 1 illustrates an embodiment of a management system, which provides means for a manager or administrator to manage various managed resources in a network.

FIG. 1 illustrates an embodiment of a management system, which provides means for a manager or administrator to manage various managed resources in a network. The illustrated management system 100 has CIM capabilities and includes a client interface 101 for use by a network manager 102, and further includes interfaces 103 to managed resources 104 in the network. The system includes a CIMOM 105, which functions as the core engine of the management system.

The CIMOM 105 usually uses either its own repository or a standard external database to hold the CIM data. The illustrated system 100 includes its own CIM schema and repository 106. The CIM schema can be loaded into the CIMOM using a format called MOF (Managed Object Format) or XML. The MOF format was the way the DMTF chose to represent the CIM schema and was used long before XML became the standard format for representing data in a neutral format. A compiler is generally used to convert the neutral CIM schema file into the internal schema representation used by the CIMOM.

The services of CIMOM are implemented by CIM providers (e.g. instance provider 107, association provider 108, method provider 109 and indication provider 110). They instrument the capabilities and the data based on the schema loaded into the CIMOM.

Sitting on top of the CIMOM is the WBEM interface 101 that is basically a HTTP server. The WBEM interface has its own unique port number. The CIM WBEM client communicates over this port to the CIMOM. Generally, the CIM WBEM client is a system management console.

The illustrated system 100 includes a file system interface 111. The file system interface 111 is illustrated as a separate module from the client interface 101. Some embodiments integrate the interfaces 101 and 111. An example of a file system interface is FUSE (Filesystem in Userspace). FUSE is a loadable kernel module that allow non-privileged users to create their own file systems without editing the kernel code. The file system code is run in user space. FUSE can be used to write virtual file systems, which acts as a view or translation of an existing file system or storage device. Embodiments of the present subject matter use FUSE to provide a file system view of CIM. The file system interface 111 is illustrated as a FUSE module (a custom CIM module written for FUSE) at the client side that is adapted to map file operations to CIM client calls.

Instances provide a way to enumerate create and delete objects. The instance provider implements the following intrinsic (pre-defined) methods: Enuminstances; EnumInstanceNames; CreateInstance, ModifyInstance, DeleteInstance; GetProperty, SetProperty. EnumInstances returns the enumaration of all the instances with all its key and non-key attributes. EnumInstanceNames returns the enumaration of all the CIM Object Paths (COP is representation of instance with its key attributes). CreateInstance, ModifyInstance, and DeleteInstance create, modify and delete instances when key attributes are specified as part of CIM Object Path. GetProperty and SetProperty are used to get and set the named properties of the instances/directory.

An association is a special kind of a class describing a link between other classes. The association provider, also referred to herein as an association/reference provider, implements Associators, Associator Names, References, and ReferenceNames. Associator enumerates the instances associated with the instance defined by one of the arguments. AssociatorNames enumerates the COPs associated with the instance defined by one of the arguments. References enumerate the association instances that refer to the instance defined by one of the arguments. ReferenceNames enumerate the association COPs that refer to the instance defined by one of the arguments.

A method provider implements extrinsic/custom methods. The method provider implements the intrinsic method, InvokeMethod. InvokeMethod invokes a named, extrinsic method of an instance defined by one of the arguments.

An indication provider is somewhat like an SNMP (Simple Network Management Protocol) agent. The indication provider produces indications on events. The indications are consumed by an indication consumer. The indications can be an e-mail indication, an SNMP mapper indication, and CIM-XML indication. The destination is filled by the client. The destination in case of CIM-XML indication is an URL where an indication handler is running. The destination receives data from the CIMOM when indications are generated. The listener can be a standalone CIM listener or can be with the CIM server.

The indication provider is implemented in different ways in terms of APIs (Application Programming Interfaces) that it implements. CreateSubscription, ModifySubscription and DeleteSubscription are APIs that tell the provider to monitor for indications matching the specified subscription, change the subscription and delete respectively. EnableIndications and DisableIndications are APIs that tell the provider to begin generating indications and stop generating indications respectively.

The present subject matter provides a file system interface to the CIM whereby the client operations can be done using file operations such as copy, delete, and the like. For a Linux platform, a module like FUSE can be used to give the file system interface. For a Windows platform, name space extensions can be used. Other platforms have similar ways of implementing the same.

Figure 2:
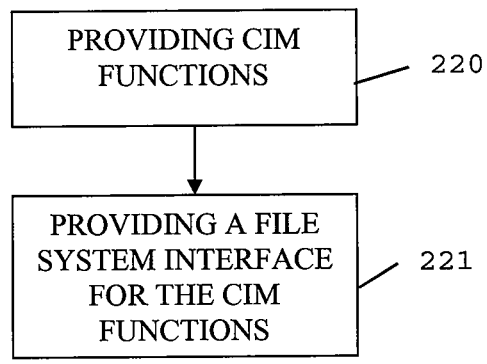
FIG. 2 illustrates an embodiment of a method for creating a management system.

FIG. 2 illustrates an embodiment of a method for creating a management system. At 220, common information model (CIM) functions are provided. At 221, a file system interface for the CIM functions is provided.

Figure 3:
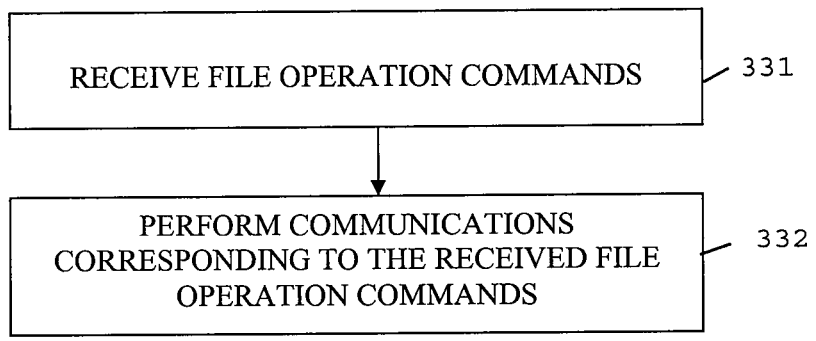
FIG. 3 illustrates an embodiment of a method for managing CIM functions using file operation commands.

FIG. 3 illustrates an embodiment of a method for managing CIM functions using file operation commands. At 331, file operation commands are received through a client interface. At 332, common information model (CIM) functions are performed corresponding to the received file operation commands based on a mapping of the file operation commands to the CIM functions.

The present subject matter maps CIM operations to file operations. For the purpose of discussion, the file system is considered to be mounted on/ekkirala. Initially when the file system is mounted after connecting to the CIMOM, a directory structure is shown that is nothing but the CIM schema. Any custom derived classes which actually instrument the capabilities and data are shown as subdirectories.

An example of a file listing is provided below:

/ekkirala/ns_root_ns/ns_cimv2_ns/
+CIM_ManagedElement
+CIM_ManagedSystemElement
+CIM_LogicalElement
+CIM_StoragePool
OMC_StoragePool The directory listing ns_root_ns/ns_cimv2_ns represents the namespace root/cimv2. This is just a portion, as the actual directory listing inside/ekkirala/ns_root_ns/ns_cimv2_ns/ may look something like that illustrated in FIG. 4, which is a screen shot of an open source application called "SNIA cim browser". CIM_UnixFile is only an abstract class. There may not be contents inside of this directory. OMC_StoragePool is the actual implementation class which is instrumented with the provider. The directory /ekkirala/ns_root_ns/ns_cimv2_ns/CIM_ManagedElement/CIM_ManagedSystemElement/CIM_LogicalElement/CIM_StoragePool/OMC_StoragePool includes the Instances/; and InstanceNames/directories.

The Instances/ directory within the OMC_StoragePool may include the following directories: 1/; 2/; 3/; 4/; 5/; and new_instance/. These five directories represent five instances of the OMC_StoragePool. Directory 1/may include the files InstanceID.string.key, PoolID.string.attr, Name.string.attr, Primordial.boolean.attr, HealthState.uint16.attr, and modified_instance.

Each of these files (InstanceID.string.key, PoolID.string.attr, Name.string.attr, Primordial.boolean.attr, HealthState.uint16.attr, and modified_instance) contain the values of the attributes/keys. For example InstanceID.string.key will have its contents as "omc:Primordial123" as the pool instance ID. The file, Name.string.attr will have the name of the pool "Primordial123" as the contents. Some embodiments provide a filename such that it gives some info about the attribute. The last part of the filename specifies if the attribute is a key or a non key value. The last but one part specifies the data type. The remaining part specifies the name of the attribute.

All these are files. However in case if the attribute is a CIM object path (Instance Name) then the attribute is a directory. For example in case of OMC_StorageSynchronized, the following directories are in the directory, /ekkirala/ns_root_ns/ns_cimv2_ns/CEM_Synchronized/CIM_StorageSynchronized/OMC_StorageSynchronized/Instances/11:

SystemElement.OMC_StorageVolume_COP.key/; and SyncedElement.OMC_StorageVolume_COP.key/.

Both the attributes are keys and they are COPs (CIM Object Paths/Instance Names) of the class OMC_StorageVolume. Since they represent another class, they in turn will have the attributes in them. The directory SystemElement.OMC_StorageVolume_COP.key may have the following contents: SystemCreationClassName.string.key; SystemName.string.key; CreationClassName.string.key; and DeviceID.string.key. For example, the contents of the file DeviceID.string.key may include a volume name "vol1".

Similarly, /ekkirala/ns_root_ns/ns_cimv2_ns/CIM_ManagedElement/CIN_ManagedSystemElement/CIM_LogicalElement/CIM_StoragePool/OMC_StoragePool/InstanceNames may include directories 1/; 2/; 3/; 4/; 5/and new_instance_name/. The five directories represent five instance names or CIM Object Paths of the OMC_StoragePool. Directory 1/may include the files InstanceID.string.key and modified_instance. There are no .attr files, because the COPs will have only key attributes and not non-key values.

The instance or instance name can be saved by archiving and compressing the directory that represents that instance. For example "tar and gzip" or "zip" can be used to archive and compress the contents of the directory /ekkirala/ns_root_ns/ns_cimv2_ns/CIM_ManagedElement/CIM_ManagedSystemElement/CIM_LogicalElement/CIM_StoragePool/OMC_StoragePool/InstanceNames/1. The compressed file can be renamed to pool1.OMC_StoragePool_COP, which is the user given name.

Similarly a directory with attribute files can be created outside the CIM FS and be archived and compressed to create pool1.OMC_StoragePool_COP. This also essentially represents the same COP which can be used for methods inside CIM FS, explained below.

In the same way if the contents of directory /ekkirala/ns_root_ns/ns_cimv2_ns/CIM_ManagedElement/CIM_ManagedSystemElement/CIM_LogicalElement/CIM_StoragePool/OMC_StoragePool/Instance/1 are compressed, it can be renamed to the file pool1.OMC_StoragePool_CIMInstance. In all of the instances we use the COP file instead of CIMInstance file except in the creation of new instance.

The attributes of the instance can be changed by modifying the contents of the file that represents the attribute or key. However there may be cases where it is required to modify the multiple attributes at once or there may be cases for changing the attribute of an instance which is a COP. For these cases a special file called modified_instance is provided in the instance or COP directory. To modify the properties of the instance, the saved file is copied to the modified_instance. The instance is modified to the values contained in the file copied to modified file. This modified_instance file always has the size of 0 bytes even after overwriting. The same file exists in both Instances and InstanceNames directories.

Mapping the CIM classes, instances and attributes into directories and files enumerates instances and instance names. Any instance can be deleted by writing a keyword such as "delete" into modified_instance file. Once an instance is deleted in Instance, its corresponding directory in InstanceNames will be deleted and vice-versa.

How to modify an instance has been addressed previously. An instance can be created by copying the COP of the file representing the instance or instance name file which was saved or which was hand crafted into the directory new_instance. A new instance directory, (e.g. directory 6/) gets created in the InstanceNames and Instances directories. This allows for multiple processes to create multiple instances simultaneously. Thus, an interface is given for EnumInstances, EnumInstanceNames, CreateInstance, ModifyInstance, DeleteInstance, GetProperty and SetProperty.

Two ways are provided below to execute intrinsic methods of the association provider. One method uses additional directories called Associators, AssociatorNames, References and ReferenceNames inside the instance (e.g. directory 1/) in case of association classes such as OMC_StorageSynchronized. For example the contents of the directory may look like:

/ekkirala/ns_root_ns/ns_cimv2_ns/CIM_Synchronized/
CIM_StorageSynchronized/OMC_StorageSynchronized/Instances/1/:
   SystemElement.OMC_StorageVolume_COP.key/
   SyncedElement.OMC_StorageVolume_COP.key/
   Associations/.

Associations have the directories Associators, AssociatorNames, References and ReferenceNames. Each of these directories have directories called Input_args and Output and a file called execute. Input_args contain the input argument names for the associator provider's intrinsic methods. To fill the arguments one just needs to copy the respective saved files or hand-crafted files to the argument files which similar to creation/modification of instances. Once the input args are copied, a "1" is written into the special file execute. This executes the method and the resulting instances will be returned in the Output directory. The instances will look similar to the instances seen in Instance or InstanceNames directory. This provides an interface for associator provider's intrinsic methods.

The association class has other classes which it associates, and these other classes have instances. Another method provides a directory called Associations inside those instances such as going into the following directory: /ekkirala/ns_root_ns/ns_cimv2_ns/CIM_ManagedElement/CIM_ManagedSystemElement/CIM_LogicalElement/CIM_StoragePool/OMC_StoragePool/InstanceNames/1. This directory has the class names of all association classes that associates OMC_StoragePool. Assuming that OMC_StorageSynchronized and OMC_HostedStoragePool are the association classes that associates OMC_StoragePool with OMC_LogicalDisk and OMC_StorageExtent (not the case, actually), then the Associations directory includes OMC_StorageSynchronized/; and OMC_HostedStoragePool/. Any of the above directories includes the directories Associators, AssociatorNames, References, and ReferenceNames. Each of these directories have two different directories called Input_args and Output and a file called execute. The rest is similar to the description provided for the first method.

The extrinsic or custom defined methods are provided by method provider. The methods are related to the instance of the method class. If there is any method class, there will be a directory called Methods in its instance directory For example, /ekkirala/ns_root_ns/ns_cimv2_ns/CIM_ManagedElement/CIM_ManagedSystemElement/CIM_LogicalElement/CIM_EnabledLogicalElement/CIM_Service/CIM_StorageConfigurationService/
OMC_StorageConfigurationService will have the directories Instances/ and InstanceNames/. The inside of directory Instances/ may include 1/ 2/ 3/ . . . etc. directories. Directory 1/may include the keys and attributes of the instance as files. Along with it there will be a directory called Methods. The Methods directory may include the directories OpenSession/; CloseSession/; CreateReplica/; ModifySynchronization/; etc. These are the extrinsic methods. CreateReplica may include: InArgs/; OutArgs/; ReturnValue.uint32; and execute. InArgs contain the argument named files which look like the following: ElementName.string; and SourceElement.CIM_LogicalElement_COP. These are the input argument file names which will have 0 byte sizes always. These arguments are filled by copying the saved/ hand-crafted files that represents the attributes or COPs etc., to the respective arg files.

Once these files are copied, then "1" is sent into the file execute. The method gets executed and the result in case of CreateReplica is an uint32 value which is made available in ReturnValue.uint32. The output arguments will be made available in OutArgs. For example in this case the output arguments are the following: Job.CIM_ConcreteJob_COP; and TargetElement.CIM_LogicalElement_COP. These files can be accessed and uncompressed to get the attributes of these instances. Thus extrinsic methods can be called from CIM FS.

Indications are provided by the Indication Provider, which uses the methods CreateSubscription, ModifySubscription, DeleteSubscription, EnableIndications and DisableIndications that are implemented in the same ways as that of the method provider. The destination for indication is specified by setting the Destination in OMC_IndicationHandlerCIMXML (derived from CIM_IndicationHandlerCIXML derived from CIM_IndicationHandler) attribute to the URL where the CIMXML listener is running in case of CIMXML indications. Similarly other indication handlers depending on whether it is e-mail or SNMP indication are filled. This instance is created which is used for delivering the indications. The listener is outside of the CIMclient. The URL is provided for the listener, effectively handing the call backs in case of indications.

In case if multiple processes are executing intrinsic and extrinsic methods, then there will be more than one output. One solution is to have a special file called id. Each time this file is read, it gives an unique number to that method which can be, say, a serial number incremented each time or a random number. Also there will be a directory created with this unique number. Now after going inside this unique numbered directory, the input args can be filled in to get the outputs and return values. Each process will first read this id file and then go into the numbered directory and then execute the method. The process after getting the results can save them and delete the directory.

CIM has its own query language which is similar to SQL. A directory called /Query. can include a directory called id. Each time this file is read, it gives an unique number. A directory created with this unique number, and this unique numbered directory input and output files. The query can be written into the input and the output will be available in output.

Inside the instances (e.g. directory 1/) the method and association directories can be softlinks so that the zip or archiving program need not follow those softlinks. Some platforms may not support softlinks and in such cases the entire directory gets zipped. But when these instances are reused by copying, the CIM file system will ignore the contents of methods and association directories.

For operations which involve the method and association directories, a unique numbered directory gets created through the id file and the file operations are performed inside the unique numbered directory. If the method execution fails then the write operation to execute will return the file operation error which is possibly best closest to the CIM error. In case of errors, an error.log file gets created with the error details.

In case of instance operations which are done through file system operations like writing into modified_file or copying files into attributes etc., the respective file operations will fail and return the file operation error which is possibly best closest to the CIM error. There will be an error.log file in the directory which contains the error. An embodiment provides the error.log with the following format: <timestamp>:<operation>:<object (the file one which operation is performed)>:error. The process sees this log file and finds the error corresponding to its operation. The number of entries in this file can be limited. For example, some embodiments limit the number to the 100 latest entries in this file. This number is configurable.

The present subject matter provides the ability to save instances or instance names as files and use them to recreate or use them as arguments, and maps CIM operations to file system operations. The present subject matter can be used to automate many tasks and enables power usage of CIM operations.

One of ordinary skill in the art will understand that, the illustrated processes and entities can be implemented using software, hardware, and combinations of software and hardware. The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive. These embodiments, or portions thereof, can be combined. In various embodiments, the methods are implemented as a set of instructions contained on a computer-accessible medium capable of directing a processor to perform the respective method. The Abstract is provided to comply with 37 C.F.R. § 1.72(b) and will allow the reader to quickly ascertain the nature and gist of the technical disclosure. It is submitted with the understanding that it will not be used to interpret or limit the scope or meaning of the claims.

The above detailed description is intended to be illustrative, and not restrictive. Other embodiments will be apparent to those of skill in the art upon reading and understanding the above description. The scope of the invention should, therefore, be determined with reference to the appended claims, along with the full scope of equivalents to which such claims are entitled.

The invention claimed is:

1. A method, comprising:
   providing common information model (CIM) functions; and
   providing a file system interface for the CIM functions, wherein providing the file system interface for the CIM functions include mapping CIM operations to file operations for the file system,
   wherein providing the file system interface for the CIM functions includes mapping CIM classes, instances and attributes into directories and files in the file system,
   wherein the file operations include copying and deleting the directories and the files in the file system, and
   wherein mapping the CIM classes, instances and attributes into the directories and files further comprises mapping CIM associations into the directories with an input argument directory, an output directory and an execute file.

2. The method of claim 1, wherein mapping CIM classes, instances and attributes into directories and files comprises representing instances as directories with files within the directories providing attribute values.

3. The method of claim 1, wherein providing the file system interface for the CIM functions includes using FUSE (Filesystem in Userspace) to provide the file system interface for the CIM functions.

4. A system, comprising:
processing circuitry configured to operate on instructions stored in a computer-accessible media to provide a file system interface to a file system and a common information model manager (CIMOM), wherein the CIMOM is adapted to provide common information model (CIM) functions, and
wherein the file system interface is operably connected to the CIMOM to map file operations to CIM client calls and provide a file system view of the CIM,
wherein the system is adapted to map CIM classes, instances and attributes into directories and files in the file system,
wherein mapping the CIM classes, instances and attributes into the directories and files further comprises mapping CIM associations into the directories with an input argument directory, an output directory and an execute file, and
wherein the file operations include copying and deleting the directories and the files in the file system.

5. The system of claim 4, wherein the CIMOM operates on a Linux platform, and the file system interface includes FUSE (Filesystem in Userspace).

6. The system of claim 4, wherein the CIMOM operates on a Windows platform, and the file system interface includes name space extensions.

7. The system of claim 4, wherein the system is adapted to perform client operations for CIM using the file operations.

8. The system of claim 4, wherein the file system interface and the CIMOM are adapted to cooperate to represent instances as directories with files within the directories providing attribute values.

9. The system of claim 8, wherein the system is adapted to save CIM instances as files for later use.

10. The system of claim 8, wherein the system is adapted to save an instance by archiving and compressing the directory that represents the instance.

11. The system of claim 8, wherein the system is adapted to change attributes of the instance by modifying file contents that represent the attribute.

12. The system of claim 11, wherein the system is adapted to copy a file with the file contents that represent the attribute to a modified instance file before modifying the file contents.

13. The system of claim 4, wherein the system is adapted to provide a CIM interface for an association/reference provider.

14. The system of claim 4, wherein the system is adapted to provide a CIM interface for an indication provider.

* * * * *

UNITED STATES PATENT AND TRADEMARK OFFICE
CERTIFICATE OF CORRECTION

PATENT NO. : 8,458,236 B2  
APPLICATION NO. : 12/173971  
DATED : June 4, 2013  
INVENTOR(S) : Sudhakar et al.

Page 1 of 1

It is certified that error appears in the above-identified patent and that said Letters Patent is hereby corrected as shown below:

In the Specification

In column 1, line 52, delete "is" and insert -- are --, therefor.

In column 3, line 17, delete "enumaration" and insert -- enumeration --, therefor.

In column 3, line 18-19, delete "enumaration" and insert -- enumeration --, therefor.

In column 4, line 66, delete "/CEM_" and insert -- /CIM_ --, therefor.

In column 4, line 67, delete "/11:" and insert -- /1/: --, therefor.

In column 5, line 11, delete ""vo11."" and insert -- "vol 1." --, therefor.

In column 5, line 13, delete "/CIN_" and insert -- /CIM_ --, therefor.

In column 5, line 15, delete "5/and" and insert -- 5/ and --, therefor.

In column 6, line 63, delete "1/may" and insert -- 1/ may --, therefor.

In column 7, line 26, delete "CIXML" and insert -- CIMXML --, therefor.

In column 7, line 48, after "Query" delete ".".

Signed and Sealed this  
Eighth Day of October, 2013

Teresa Stanek Rea  
*Deputy Director of the United States Patent and Trademark Office*